United States Patent
Walker et al.

(10) Patent No.: US 9,785,362 B2
(45) Date of Patent: Oct. 10, 2017

(54) METHOD AND APPARATUS FOR MANAGING CORRUPTION OF FLASH MEMORY CONTENTS

(71) Applicant: QUALCOMM TECHNOLOGIES International, Ltd., Cambridge (GB)

(72) Inventors: Gary Walker, Phoenix, AZ (US); Nikhil Bhatia, Gilbert, AZ (US); Tom Ricks, Tempe, AZ (US); Igor Prilepov, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/801,182

(22) Filed: Jul. 16, 2015

(65) Prior Publication Data

US 2017/0017415 A1     Jan. 19, 2017

(51) Int. Cl.
| | | |
|---|---|---|
| *G06F 17/40* | (2006.01) | |
| *G06F 1/00* | (2006.01) | |
| *G06F 3/06* | (2006.01) | |
| *G06F 11/14* | (2006.01) | |

(52) U.S. Cl.
CPC .......... *G06F 3/0619* (2013.01); *G06F 3/0652* (2013.01); *G06F 3/0679* (2013.01); *G06F 11/1433* (2013.01); *G06F 11/1441* (2013.01); *G06F 11/1451* (2013.01); *G06F 11/1471* (2013.01)

(58) Field of Classification Search
CPC .... G06F 3/0482; G06F 11/3636; G06F 9/466; G06F 11/3065; G06F 11/1471; G06F 3/0652; G06F 3/0679
See application file for complete search history.

(56) References Cited

U.S. PATENT DOCUMENTS

| 6,260,156 B1 | 7/2001 | Garvin et al. | |
|---|---|---|---|
| 2004/0034775 A1* | 2/2004 | Desjardins | G06Q 20/206 713/170 |
| 2004/0073831 A1* | 4/2004 | Yanai | G06F 3/0601 714/6.32 |
| 2007/0169098 A1 | 7/2007 | Kikuchi | |
| 2009/0287874 A1 | 11/2009 | Rogers et al. | |

(Continued)

OTHER PUBLICATIONS

International Search Report and Written Opinion—PCT/EP2016/063957—ISA/EPO—Sep. 23, 2016.

*Primary Examiner* — David X Yi
*Assistant Examiner* — Candice Rankin
(74) *Attorney, Agent, or Firm* — Procopio, Cory, Hargreaves & Savitch LLP/Qualcomm

(57) ABSTRACT

The present invention relates to methods and apparatuses for eliminating or mitigating the effects of the corruption of contents in an external flash memory, such as that which can occur during a power interruption. Embodiments of the invention include methods to log external flash memory program and erase operations redundantly to dedicated buffer partitions in the flash memory itself. The log information from external serial flash memory is used to erase the sector that was being programmed or erased when power was removed. According to certain aspects, the redundant storage of log information in embodiments ensures that if one version of the log information is corrupted, the other version can be used.

20 Claims, 4 Drawing Sheets

(56) References Cited

U.S. PATENT DOCUMENTS

| | | | | |
|---|---|---|---|---|
| 2010/0169543 A1* | 7/2010 | Edgington | .......... | G06F 12/0246 711/103 |
| 2014/0297742 A1* | 10/2014 | Lyren | .................... | H04L 65/403 709/204 |
| 2014/0317373 A1* | 10/2014 | Kim | ..................... | G11C 16/349 711/167 |

* cited by examiner

METHOD AND APPARATUS FOR MANAGING CORRUPTION OF FLASH MEMORY CONTENTS

FIELD OF THE INVENTION

The present invention relates to managing computer memory contents, and more particularly to a method and apparatus for preventing corruption of code and allowing for recovery when data corruption occurs in a flash memory.

BACKGROUND OF THE INVENTION

Flash memory is used in a variety of computer applications. For parallel types of flash memory, the signal interface between a computer processor and an external flash memory is controlled as specified by the external flash manufacturer. Some manufactures provide mechanisms via this interface to prevent or help recover from the effects of corruption of flash memory contents, such as that which can occur when the power supply to the computer processor and/or flash memory is interrupted. However, serial types of flash memory have become more popular and do not typically include such mechanisms.

This can present a problem in systems having external serial flash memories coupled to host processors, in which the power to the system can be removed at any time. This requirement is especially challenging if the external flash memory is being erased or programmed by the host processor when power is removed.

Co-pending U.S. application Ser. No. 14/554,325, the contents of which are incorporated herein by reference in their entirety, dramatically advanced the state of the art by providing methods and apparatuses in which non-volatile RAM in the system is used to log write and erase operations to external serial flash memory. This log information is used to determine if a sector should be erased on power up because power was removed while a program or erase operation was occurring. However, in some systems, backup power may not be maintained to the non-volatile RAM while power is removed. Consequently, the non-volatile RAM may be invalid when power is reapplied, such that all sectors in external serial flash memory that could be in a partially programmed or over-erased state are erased. Accordingly, there remains a need for a solution to this problem, among others.

SUMMARY OF THE INVENTION

The present invention relates to methods and apparatuses for eliminating or mitigating the effects of the corruption of contents in an external flash memory, such as that which can occur during a power interruption. Embodiments of the invention include methods to log external flash memory program and erase operations redundantly to dedicated buffer partitions in the flash memory itself. The log information from external serial flash memory is used to erase the sector that was being programmed or erased when power was removed. According to certain aspects, the redundant storage of log information in embodiments ensures that if one version of the log information is corrupted, the other version can be used.

In accordance with these and other aspects, a method of managing corruption of data in a flash memory device according to embodiments of the invention includes maintaining first and second separate book-keeping structures in the flash memory device, identifying a portion of the flash memory device in which an erase or program operation is to be commenced, and setting a field in both of the first and second book-keeping structures that includes the identified portion and indicates that an erase or program operation is being performed, such that if a corruption event occurs during the erase or program operation, a possible corruption of the identified portion of the flash memory can be determined from the first and second book-keeping structures.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
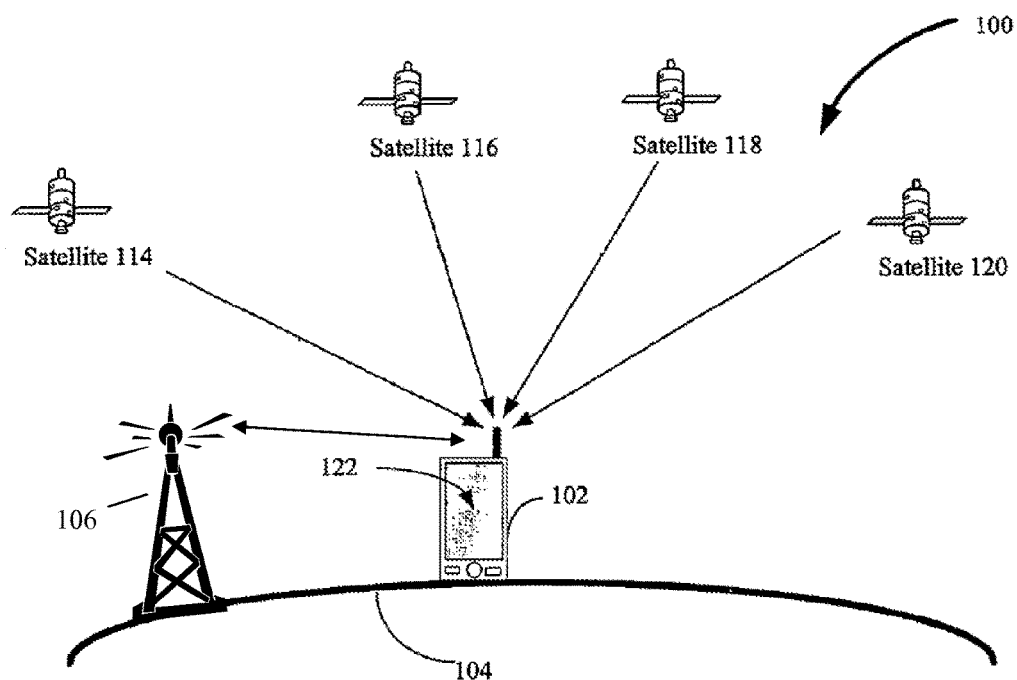
FIG. 1 is a block diagram illustrating an example device in which embodiments of the invention can be implemented.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention provides techniques to prevent code corruption and mitigating effects of data corruption in an external serial flash memory coupled to a computer processor. According to certain aspects, code corruption prevention includes partitioning code and data in separate physical blocks of a flash memory to prevent code corruption due to sudden loss of power during data erase or programs. According to still further aspects, a book-keeping mechanism helps in detecting data corruption events and possible recovery without impacting the device performance. In embodiments, external flash memory program and erase operations are logged redundantly to the flash memory itself, and thus removes the need for non-volatile RAM. Accordingly, if an power interruption to the external flash memory corrupts one version of the log information, the other one can be used. In these and other embodiments, wear levelling techniques for the log information stored in serial flash memory device are also used to extend the life of serial flash memory.

Embodiments of the invention will be described in connection with a useful application in global satellite positioning systems. However, the invention is not limited to this application, and those skilled in the art will understand how to implement the invention in other types of systems after being taught by the present examples.

FIG. 1 illustrates an example implementation of embodiments of the invention. As shown in FIG. 1, an example system 100 includes GNSS satellites (i.e. satellite vehicles or SVs) 114, 116, 118 and 120 that broadcast signals that are received by GNSS module 122 in device 102, which is located at a user position somewhere relatively near the surface of earth 104. The term Global Navigation Satellite System (GNSS) is used as the standard generic term for satellite navigation systems ("sat nav") that provide autonomous geo-spatial positioning with global coverage. Examples of GNSS systems include the Global Positioning System ("GPS"), GLONASS, Galileo and BDS. GNSS module 122 can be configured to use signals from satellites of only a single one of these systems, or it can be configured to use signals from satellites of two or more of these systems.

Device 102 can be a cellular or other type of telephone with built-in GPS functionality (e.g. iPhone, Galaxy or other Android smartphone, etc.), or it can be a notebook or tablet computer (e.g. iPad, Galaxy Note, Surface, etc.) with similar built-in positioning functionality, or it can be a personal navigation device (PND, e.g. from Garmin, TomTom, etc.) or a tracking device (e.g. automotive tracking from Trimble, package or fleet management tracking from FedEx, child locator tracking applications etc), or an automobile navigation/media system, or a watch (e.g. Nike sport watch), etc.

GNSS module 122 can be implemented using any combination of hardware and/or software, including chipsets such as SiRFstar V from CSR Technology, as adapted and/or supplemented with functionality in accordance with the present invention, and described in more detail herein. More particularly, those skilled in the art will be able to understand how to implement the present invention by adapting and/or supplementing such chipsets and/or software with the code and data corruption improvement techniques of the present invention after being taught by the present specification.

In operation, using signals from at least four SVs 114, 116, 118, 120, GNSS module 122 provides a 3-dimensional navigation solution (only three satellites are required for a 2-dimensional navigation solution, e.g. by using known height), for example by performing trilateration techniques and using PVT filters and algorithms known to those skilled in the art. This solution can be also based on, or supplemented by, inertial signals such as those from accelerometers. The navigation solution from GNSS module 122 can be used by device 102 in a variety of ways, depending on the type of device. As shown, device 102 can also include hardware/software functionality for communicating with a network 106 (e.g. telephone, WiFi, Internet, etc.).

Figure 2:
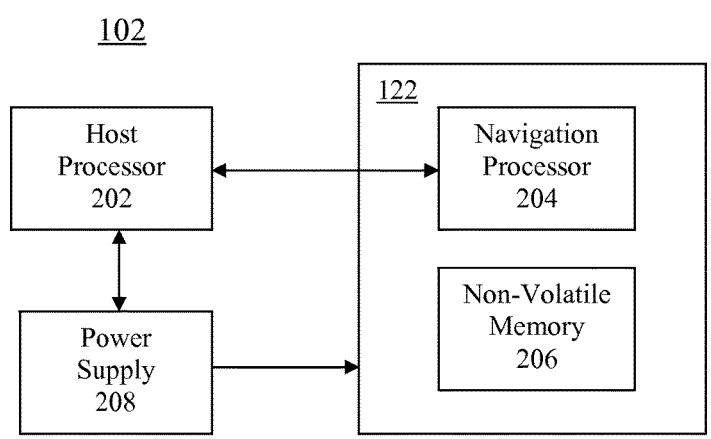
FIG. 2 is a block diagram further illustrating an example device in which embodiments of the invention can be implemented.

FIG. 2 is a block diagram illustrating an example device 102 according to embodiments of the invention. As shown, device 102 includes a host processor 202 (e.g. CPU and associated software/firmware) that communicates with a navigation processor 204 in GNSS module 122 using a defined interface (e.g. UART, I2C, SPI, etc. in example embodiments where GNSS module 122 is implemented by a SiRFstar V). Processor 204 further communicates with its own dedicated non-volatile memory 206 (e.g. flash memory). It should be apparent that device 102 can include many additional components such as memories, displays, network interfaces, etc. Likewise GNSS module 122 can include many additional components such as antennas, RF signal processors, accelerometers, etc. However, these additional components are not illustrated for the sake of clarity of the invention.

In typical operation, when desired by host processor 202, navigation processor 204 provides a GNSS-derived navigation solution (e.g. location and time) to host processor 202 at defined intervals such as one report every one second. In embodiments, host processor 202 can also provide initial software (i.e. code) setups or updates to navigation processor 204, which navigation processor 204 stores in non-volatile memory 206 when provided.

As further shown in FIG. 2, device 102 further includes a power supply 208 that is controlled by host processor 202. In embodiments, both code and data for navigation processor 204 is stored in non-volatile memory 206. However, since host processor 202 controls the power supply 208, it can remove power to navigation processor 204 and non-volatile memory 206 at any time (e.g. in response to power on/off switch on device 102, etc.). If power is removed while the memory 206 is performing an erase or program of either code or data, corruption can occur.

More particularly, in one example embodiment, non-volatile memory 206 is a serial flash memory. The present inventors have discovered that, due to the physical architecture of the serial flash memory device, other data within the same physical block being erased or programmed can be corrupted. Data within a physical block share bit lines. When a specific bit is not completely erased or programmed, such as when power is removed during an erase or program operation, the value read from other bits within that physical block can either be incorrect or inconsistent. However, if the corrupted data is subsequently fully erased, the value read from the other bits within the physical block will now be correct. In addition, an incomplete erase operation may leave bits in an over-erased condition. An over-erased bit may cause programmed bits (0s) in other sectors of the same physical block to appear as erased (1s) when read due to leakage of the over-erased cell and the shared bit line architecture. This means that the value read from other bits within that physical block can either be incorrect or inconsistent. If the sector with the over-erased bits is subsequently erased again, the leakage problem is eliminated and other sectors within the same physical block can be read correctly. The physical block sizes vary based on the manufacturer and serial flash memory size. Physical block sizes include 4 KB, 64 KB, 128 KB, 256 KB and 512 KB.

According to certain aspects, the present invention eliminates the risk of code corruption and detects data corruption due to such events. According to further aspects, if there is a possibility of data corruption, an attempt is made to restore the data. Example embodiments in furtherance of these and other aspects will be described herein below.

Figure 3:
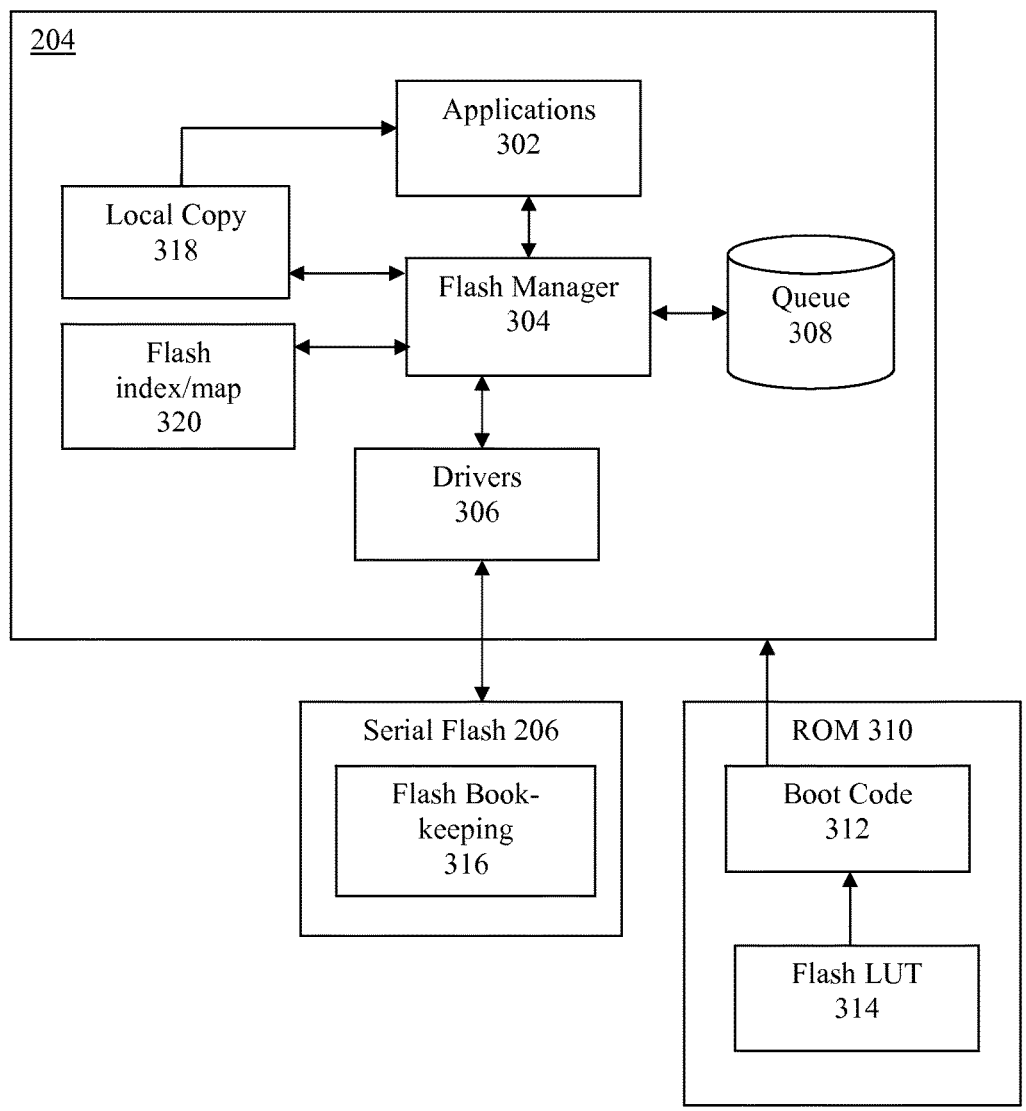
FIG. 3 is a functional block diagram illustrating example approaches for managing corruption of flash memory contents according to embodiments of the invention.

FIG. 3 is a functional block diagram illustrating an example approach to managing corruption of data and code, for example due to loss of power during programming and erasing operations, in a GNSS module 122 such as that shown in FIG. 2 according to embodiments of the invention.

As shown in the example of FIG. 3, further coupled to processor 204 is a read-only memory (ROM) 310 that includes boot code 312 and a flash lookup table (LUT) 314. On power-up or other initiation of module 112, processor 204 is configured to execute boot code 312 from ROM 310. As part of this boot code 312, processor 204 interacts with external serial flash memory 206 to determine its manufacturer, using signals well known to those skilled in the art. A flash lookup table (LUT) 314 is also stored in ROM 310 to determine the configuration for storing code and data for the detected serial flash memory. Based on the manufacturer, the configuration is identified and stored in flash memory map/index 320. As shown in the example embodiment of FIG. 3, this memory map/index 320 is dynamically generated and stored in volatile memory of processor 204.

Figure 4:
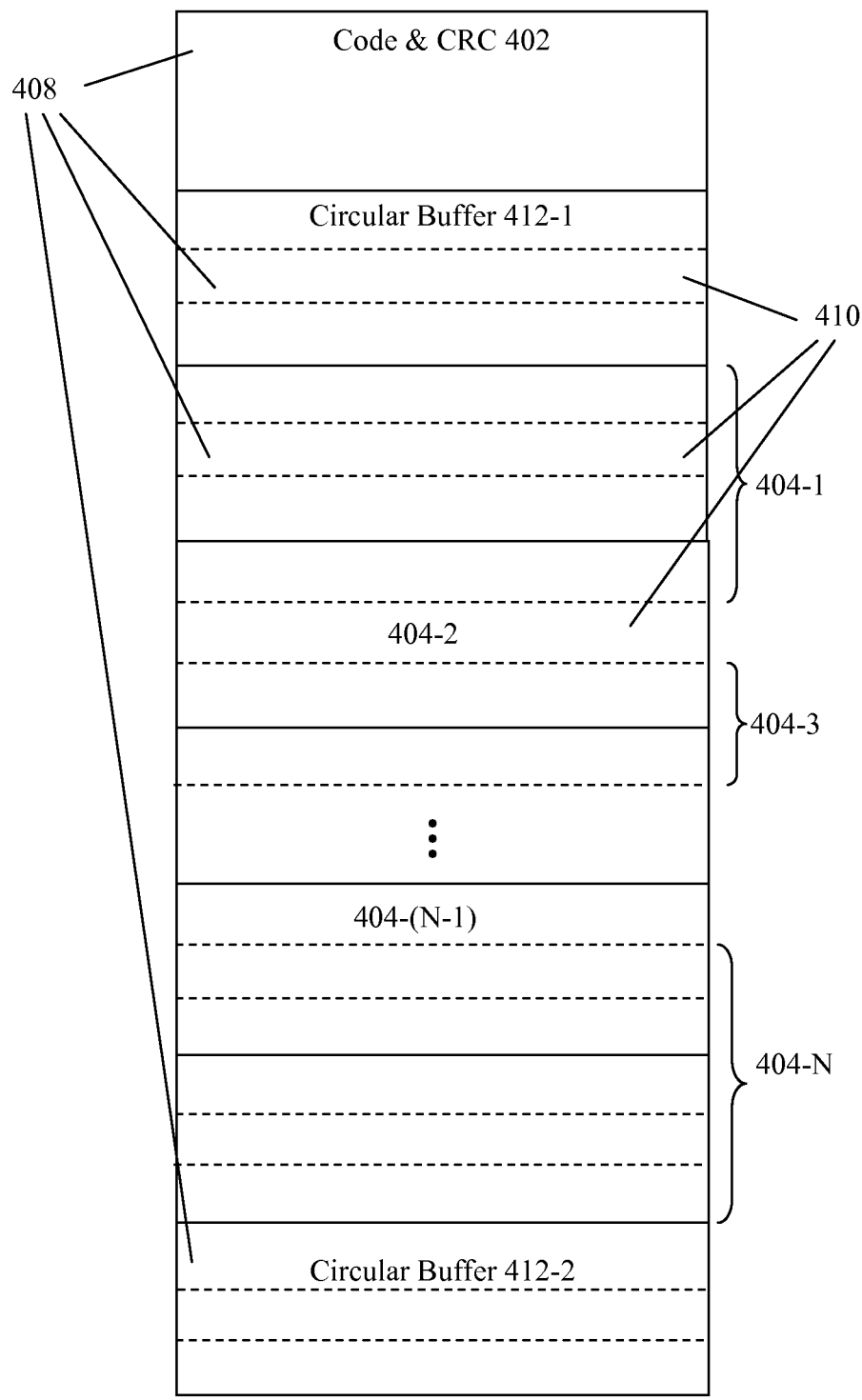
FIG. 4 is a diagram illustrating an example method of partitioning a flash memory according to embodiments of the invention.

FIG. 4 illustrates an example configuration of memory 206 according to embodiments of the invention. As shown, and according to aspects of the invention, to prevent code in the external serial flash memory 206 from being corrupted due to sudden loss of power during data program or erase, code is located in separate physical blocks from data. This prevents code from being corrupted by partially programmed or erased data. More particularly, as shown in this example, memory 206 includes a code partition 402 and a plurality of data partitions 404-1 to 404-N. It should be noted that in the co-pending application, each data partition 404 corresponds to a single data type used by applications 302. However, it is not necessary in all embodiments for there to be separate partitions 404 for different data types.

As shown in FIG. 4, according to code corruption prevention aspects of the invention, partition 402 is in a separate one or more physical blocks 408 from the physical blocks 408 occupied by the data partitions 404. As further shown, each block 408 is comprised of one or more sectors 410. Data partitions 404 can occupy one or more sectors 410. In the example of FIG. 4, data partitions 404 can span across different blocks 408, and two or more data partitions 404 can occupy the same physical block 408.

As further shown in FIG. 4, according to data corruption management aspects of the invention, memory 206 is further partitioned to include two circular buffers 412-1 and 412-2 to implement the flash bookkeeping structure 316 as will be described in more detail below. In the example shown in FIG. 4, one circular buffer 412-1 is located in the first physical block 408 after the block(s) 408 containing the code and CRC in partition 402, and the other circular buffer 412-2 is located in the last physical block 408 of the memory 206.

In some embodiments, the particular configuration of memory 206, including block size and the particular locations and sizes of partitions 402, 404 and 412 for each flash manufacturer is pre-determined and stored in LUT 314. In other embodiments, only the physical block size is stored in LUT 314, and the locations and/or sizes of some or all of partitions 402, 404 and 412 are determined dynamically based on the physical block size, the amount of code, and the number of sizes of data types. In any event, once the partitions are determined, information regarding them is stored in flash map/index 320 for subsequent use by FM 304 for reading and writing data from and to data partitions 404.

It should be noted that although partitions 402 and 404 are illustrated as occupying contiguous physical blocks, this is not necessary in all embodiments. The only requirement is that code partition 402 is in separate physical block(s) 408 from block(s) 408 occupied by data partitions 404, as well as block(s) occupied by circular buffers 412.

As further shown in FIG. 4, and to be described in more detail below, along with code, a CRC value is stored in partition 402. Similarly, one or more CRC values are stored for every data partition 404 as will be described in more detail below. It should be noted that other validation techniques other than CRC can be used, such as checksums, etc.

Returning to FIG. 3, upon completion of the above-described configuration of memory 206, boot code 312 configures processor 204 for regular operation. In the illustrated example of processor 204, this includes initiating applications 302 (e.g. GNSS navigation applications that process satellite data to obtain navigation solutions), flash manager (FM) 304, and drivers 306. Generally, and as will be described in more detail below, flash manager 304 handles all accesses to flash memory 206 requested by applications 302 and using drivers 306. Meanwhile, the particular implementation details of applications 302 and drivers 306 are not necessary for an understanding of the present invention, and so they will be omitted here for the sake of clarity of the invention. The code for causing processor 204 to execute applications 302, FM 304 and drivers 306 can be stored in one or both of memory 206 and ROM 310, and boot code 312 can load some or all of this code in volatile program memory in processor 204, as will be appreciated by those skilled in the art.

Requests from applications 302 to access data in flash memory 206 are placed in a queue 308 by FM 304. In embodiments, these requests are executed by FM 304 using information in flash map/index 320 at the end of each processing cycle if there is enough time left for execution. This ensures that performance of high priority tasks is not impacted by flash access operations. For example, applications 302 can be executed in threads, with certain operations that are scheduled to be completed every cycle (e.g. processing to produce a navigation solution once every second). In these and other embodiments, FM 304 executes at a lower priority than these operations, and only during the remaining time of each processing cycle.

In embodiments to be described in more detail below, FM 304 causes all requested erase or program accesses to flash memory 206 to be protected from corruption by storing key details into book-keeping structure 316 prior to the start of the operation using a book-keeping mechanism. In embodiments shown in FIG. 3, book-keeping structure 316 is kept in serial flash memory 206 coupled to processor 204.

Serial flash memory book-keeping structure 316 also includes a CRC32 which is used to determine if the book-keeping information is valid. The following shows an example of book-keeping structure 316 according to embodiments of the invention.

| CRC32 | Program/Erase | Status | Log Counter | Reserved |
|---|---|---|---|---|
| (32 bits) | Sector # (13 bits) | (2 bits) | (13 bits) | (4 bits) |

In this example, the appropriate status bit is set to 1 immediately before processor 204 begins programming or erasing a sector (there is one dedicated bit each for program and erase), and is set to 0 after the program or erase has been completed. The P/E Sector is the sector that is currently being programmed or erased. This is valid only if any status bit is set to 1.

According to aspects of the invention, there are two copies of this book-keeping log structure. The two copies of this book-keeping log structure are stored in circular buffers 412-1 and 412-2, respectively, in external serial flash memory 206. In embodiments, multiple sectors are used for these circular buffers for wear-levelling advantages. As shown in FIG. 4, each circular buffer 412 is in a different physical block 408. Since the book-keeping log structures are in different physical blocks, an over-erased sector can only corrupt one of the book-keeping log structures.

During each erase or program operation, the log counter in the book-keeping log structure is incremented. After the very first power up (e.g. factory reset), the log counter is 0 for the first erase or program operation. When the log counter reaches 8191 in this example of a 13 bit counter, the next log counter value is 0 (i.e. it rolls over).

As further shown in this example, a CRC32 covers the book-keeping log structure to ensure its integrity. Also in this example, the first entry written to both circular buffers is aligned to a 16-byte boundary and the entry selected is randomly selected for wear levelling reasons. The first entry offset is the same in both circular buffers.

As described in more detail in the co-pending application, embodiments of FM 304 according to the present invention can ensure that all data stored in flash memory 206 are stored in terms of data records. Most serial flash memory manufacturers define a sector to be 4 KB, and so embodiments of FM 304 define data records in terms of flash memory sectors. In these and other embodiments, FM 304 causes drivers 306 to erase data in partitions 404 of the flash memory 206 using the serial flash memory sector erase command. Most serial flash memory manufacturers also support a page program command where 1 to 256 bytes are written, and in embodiments FM 304 causes drivers 306 to perform all program operations using a page program command.

Figure 5:
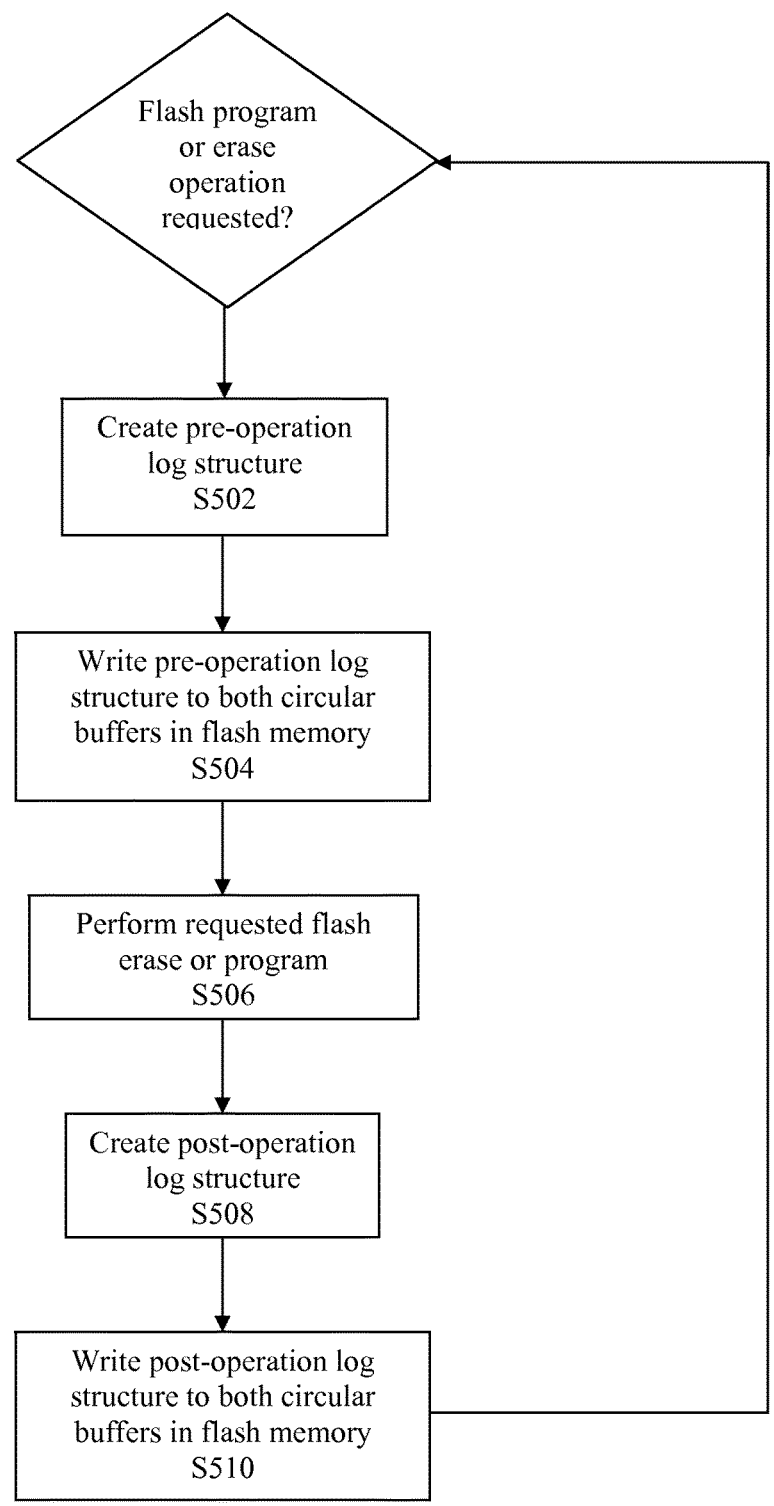
FIG. 5 is a flowchart illustrating example aspects of managing flash memory operations according to embodiments of the invention.

FIG. 5 is a flowchart illustrating an example sequence that occurs for an erase or program operation according to embodiments of the invention.

As shown, whenever applications 302 request that any data partition 404 be erased or programmed, in step S502 FM 304 first creates a book-keeping structure 316 indicating the start of the requested program or erase operation. This is called the pre-operation log structure. In this step, FM 304 retrieves pointers from flash index 320 to the latest copies of book-keeping structure 316 in circular buffers 412-1 and 412-2. In an example of the book-keeping structure 316 shown above, based on the latest copies, FM 304 increments the log counter by one from its previous value, sets the appropriate status bit to 1, and writes the sector number for the requested operation in the P/E sector field. To complete the pre-operation log structure, FM 304 performs a CRC on the updated contents and writes the CRC value to the CRC field of the pre-operation log structure.

In a next step S504 FM 304 updates the pointers to the next entries in the first and second circular buffers 412-1 and 412-2 in flash index 320, and causes the pre-operation log structure to be written to the updated locations in the buffers.

In step S506, FM 304 causes the requested erase or program operation to be performed. In connection with a program operation, embodiments of the invention can employ techniques of writing data to sectors as described in more detail in the co-pending application.

After completion of the requested erase or program operation, in step S508 FM 304 creates a book-keeping structure 316 indicating the completion of the requested program or erase operation. This is called the post-operation log structure. In this step, FM 304 retrieves pointers from flash index 320 to the latest copies of book-keeping structure 316 in circular buffers 412-1 and 412-2. FM 304 resets the appropriate status bit to 0, performs a CRC on the updated contents and writes the CRC value to the CRC field of the post-operation log structure.

In a next step S510 FM 304 updates the pointers to the next entries in the first and second circular buffers 412-1 and 412-2 in flash index 320, and causes the post-operation log structure to be written to the updated locations in the buffers. It should be noted that in the present example of an 8-byte book-keeping log structure, the pre-operation log structure and the post-operation log structure are always written to consecutive 16 byte entries in the first and second circular buffers 412-1 and 412-2.

If a power loss occurs during a program or erase operation, and then power is reapplied to GNSS module 122, boot code 312 will configure processor 204 as described above, and initiate FM 304. When first initiated, FM 304 identifies the last valid pre-operation book-keeping log structure in either of circular buffers 412-1 and 412-2 by reading all of the pre-operation log structure entries in both of circular buffers 412-1 and 412-2 and determining which entry has the highest log counter value. Once identified, FM 304 further determines if the last entry is valid by calculating a CRC on the contents and comparing the calculated CRC with the stored CRC. If not valid, the next to last valid pre-operation book-keeping log structure having the next highest log counter value is identified and the process continues until one is found. It should be noted that a pre-operation book-keeping log structure with the same highest log counter value may be valid in both, one or neither circular buffers.

If a valid pre-operation book-keeping log structure is not found in either the first or second circular buffer 412-1 or 412-2, no program or erase operation occurred. All sectors 410 corresponding to the first and second circular buffers 412-1 and 412-2 are erased. No other steps are required.

If a valid pre-operation book-keeping log structure is found in either circular buffer, FM 304 performs the following further operations.

If at least one valid pre-operation book-keeping log structure is identified, FM 304 finds and reads the corresponding post-operation book-keeping log structure having the same log counter value from both circular buffers 412-1 and 412-2. FM 304 further calculates a CRC on the contents and compares the calculated CRC with the stored CRC value(s).

If one or both post-operation book-keeping log structures have a valid CRC, the erase or program operation completed successfully. All sectors corresponding to the first and second circular buffers 412-1 and 412-2 are erased. No other steps are required.

If both post-operation book-keeping log structures have an invalid CRC and the last valid pre-operation book-keeping log structure indicated that a sector was being erased, FM 304 causes the sector specified in the pre-operation log structure to be erased. All sectors corresponding to the first and second circular buffers 412-1 and 412-2 are erased. No other steps are required.

If both post-operation book-keeping log structures have an invalid CRC, and the last valid pre-operation book-keeping log structure indicated that a sector was being programmed, then FM 304 reads that sector into local copy 318. Note that the sector may contain one or more valid files or data records. A valid file or data record is indicated by a valid CRC32. A file may be valid because it was programmed previously or because the program operation completed. This sector is then erased. Next, all sectors corresponding to the first and second circular buffers are erased. Finally, FM 304 causes the valid files or data records in the sector that was read into local copy 318 to be re-written and the normal logging process described in connection with the flowchart in FIG. 5 is used during this operation. No other steps are required.

It should be noted that whenever both circular buffers are erased, the next log counter value is 0.

It should be further noted that by storing the book-keeping information redundantly in serial flash memory, and managing this log information appropriately, non-volatile RAM is not required as in the co-pending application. As such, in many applications of the present invention the amount of non-volatile RAM needed may be reduced or eliminated and this will reduce the amount of hibernate current required. For some applications, lower hibernate current is very important.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of managing corruption of contents in a flash memory device, the method using a first circular buffer and a second circular buffer stored in the flash memory device, each circular buffer being for storing bookkeeping log structures, each bookkeeping log structure including a sector number, a status field, a log counter, and a validation value determining validity of the contents of the bookkeeping log structure, the method comprising:
   performing an erase operation on a first sector in the flash memory device, the erase operation including
      creating a first pre-operation bookkeeping log structure, the pre-operation bookkeeping log structure having
         the sector number set to identify the first sector,
         the status field set to indicate an erase operation, and
         the validation value set based on the sector number, the status field, and the log counter,
      writing the first pre-operation bookkeeping log structure to the first circular buffer and the second circular buffer,
      erasing the first sector,
      creating a first post-operation bookkeeping log structure from the first pre-operation bookkeeping log structure by
         clearing the status field and
         setting the validation value based on the sector number, the status field, and the log counter, and
      writing the first post-operation bookkeeping log structure to the first circular buffer and the second circular buffer;
   performing a program operation in a second sector in the flash memory device, the program operation including
      creating a second pre-operation bookkeeping log structure, the pre-operation bookkeeping log structure having
         the sector number set to identify the second sector,
         the status field set to indicate a program operation,
         the validation value set based on the sector number, the status field, and the log counter,
      writing the second pre-operation bookkeeping log structure to the first circular buffer and the second circular buffer,
      programming the first sector,
      creating a second post-operation bookkeeping log structure from the second pre-operation bookkeeping log structure by
         clearing the status field and
         setting the validation value based on the sector number, the status field, and the log counter, and
      writing the post-operation bookkeeping log structure to the first circular buffer and the second circular buffer; and
   determining a possible corruption of the contents in the flash memory device using the bookkeeping log structures from the first circular buffer and the second circular buffer.

2. The method of claim 1, wherein the flash memory device is a serial flash memory device.

3. The method of claim 1, wherein physical blocks are portions of the flash memory device in which a corrupted bit can corrupt reading other bits in the same physical block, and
   wherein the first bookkeeping log structure and the second bookkeeping log structure are stored in separate physical blocks.

4. The method of claim 1, wherein the validation values of the bookkeeping log structures are cyclic redundancy check (CRC) values.

5. The method of claim 1, wherein values of the log counters in the bookkeeping log structures increment between the erase operations and the program operations.

6. A device comprising:
   a processor; and
   a flash memory device coupled to the processor and containing code and data for use by applications executed by the processor,
   the processor including a flash manager that manages access to the flash memory device by performing the method of claim 1.

7. The method of claim 1, wherein determining the possible corruption of the contents the flash memory device comprises:
   identifying the last valid pre-operation bookkeeping log structure.

8. The method of claim 7, wherein identifying the last valid pre-operation bookkeeping log structure comprises:
   reading all of the pre-operation bookkeeping log structures; and
   determining the highest log counter value of the read pre-operation bookkeeping log structures.

9. The method of claim 8, further comprising:
   determining whether the pre-operation bookkeeping log structure having the highest log counter value has a valid validation value; and
   in the case that the pre-operation bookkeeping log structure having the highest log counter value has a valid validation value,
      identifying the pre-operation bookkeeping log structure having the highest log counter value as the last valid pre-operation bookkeeping log structure.

10. The method of claim 9, further comprising:
   in the case that the pre-operation bookkeeping log structure having the highest log counter value does not have a valid validation value, determining the second highest log counter value of the read pre-operation bookkeeping log structures, determining whether the pre-operation bookkeeping log structure having the second highest log counter value has a valid validation value, and in the case that the pre-operation bookkeeping log structure having the highest log counter value has a valid validation value, identifying the pre-operation bookkeeping log structure having the second highest log counter value as the last valid pre-operation bookkeeping log structure.

11. The method of claim 7, further comprising:
in the case that no last valid pre-operation bookkeeping log structure can be identified,
erasing the first circular buffer and the second circular buffer.

12. The method of claim 7, further comprising:
reading the post-operation bookkeeping log structures corresponding to the last valid pre-operation bookkeeping log structure; and
determining whether the read post-operation bookkeeping log structures have valid validation values.

13. The method of claim 12, further comprising:
in the case that at least one of the read post-operation bookkeeping log structures has a valid validation value,
determine that possible corruption of the contents the flash memory device has not occurred.

14. The method of claim 12, further comprising:
in the case that neither of the read post-operation bookkeeping log structures has a valid validation value and
in the case that the status field of the last valid pre-operation bookkeeping log structure indicates the erase operation,
erasing a third sector of the flash memory device identified by the sector number in the last valid pre-operation bookkeeping log structure, and
erasing the first circular buffer and the second circular buffer.

15. The method of claim 12, further comprising:
in the case that neither of the read post-operation bookkeeping log structures has a valid validation value and
in the case that the status field of the last valid pre-operation bookkeeping log structure indicates the program operation,
reading the contents of a third sector of the flash memory device identified by the sector number in the last valid pre-operation bookkeeping log structure,
erasing the third sector of the flash memory device, and
erasing the first circular buffer and the second circular buffer.

16. The method of claim 15, further comprising:
in the case that neither of the read post-operation bookkeeping log structures has a valid validation value and
in the case that the status field of the last valid pre-operation bookkeeping log structure indicates the program operation,
rewriting any valid contents read from third sector of the flash memory device.

17. The method of claim 15, wherein rewriting any valid contents read from the third sector of the flash memory device comprises:
performing a program operation in the third sector of the flash memory device, the program operation including
creating a third pre-operation bookkeeping log structure, the third pre-operation bookkeeping log structure having
the sector number set to identify the third sector,
the status field set to indicate a program operation,
the validation value set based on the sector number, the status field, and the log counter,
writing the third pre-operation bookkeeping log structure to the first circular buffer and the second circular buffer,
programming the third sector,
creating a third post-operation bookkeeping log structure from the third pre-operation bookkeeping log structure by
clearing the status field and
setting the validation value based on the sector number, the status field, and the log counter, and
writing the third post-operation bookkeeping log structure to the first circular buffer and the second circular buffer.

18. The method of claim 1, wherein determining the possible corruption of the contents the flash memory device is triggered when power is applied to the flash memory device.

19. The method of claim 1, wherein locations of the pre-operation bookkeeping log structures are randomly selected.

20. The method of claim 19, wherein the post-operation bookkeeping log structures are stored adjacent to the corresponding pre-operation bookkeeping log structures.

* * * * *